(12) United States Patent
Kannan et al.

(10) Patent No.: US 9,223,861 B2
(45) Date of Patent: Dec. 29, 2015

(54) METHOD AND SYSTEM FOR AUTOMATIC ASSIGNMENT OF IDENTIFIERS TO A GRAPH OF ENTITIES

(75) Inventors: Balaji Kannan, Sunnyvale, CA (US); Aamod Sane, Fremont, CA (US); Zhiwei Gu, Sunnyvale, CA (US)

(73) Assignee: YAHOO! INC., Sunnyvale, CA (US)

( * ) Notice: Subject to any disclaimer, the term of this patent is extended or adjusted under 35 U.S.C. 154(b) by 201 days.

(21) Appl. No.: 13/468,320

(22) Filed: May 10, 2012

(65) Prior Publication Data

US 2013/0304741 A1 Nov. 14, 2013

(51) Int. Cl.
*G06F 17/30* (2006.01)
(52) U.S. Cl.
CPC ...... *G06F 17/30734* (2013.01); *G06F 17/3089* (2013.01)
(58) Field of Classification Search
None
See application file for complete search history.

(56) References Cited

U.S. PATENT DOCUMENTS

| 2002/0169840 | A1* | 11/2002 | Sheldon et al. | 709/206 |
| 2005/0203927 | A1* | 9/2005 | Sull et al. | 707/100 |
| 2007/0198481 | A1* | 8/2007 | Hogue et al. | 707/3 |
| 2009/0119284 | A1* | 5/2009 | Chen et al. | 707/5 |

\* cited by examiner

*Primary Examiner* — Hung Q Pham
(74) *Attorney, Agent, or Firm* — Pillsbury Winthrop Shaw Pittman LLP

(57) ABSTRACT

Method, system, and programs for providing identifiers to objects. Input data representing a plurality of objects is received and categorized into a plurality of entity categories. A first graph of entities is generated using the plurality of entity categories. The first graph of entities are matched with a second graph of entities. A comparison of object pairs is then made, in which each object pair includes a first object from the first graph of entities and a corresponding second object from the second graph of entities. Identifiers are assigned to each object based on comparing the object pairs.

18 Claims, 20 Drawing Sheets

METHOD AND SYSTEM FOR AUTOMATIC ASSIGNMENT OF IDENTIFIERS TO A GRAPH OF ENTITIES

BACKGROUND

1. Technical Field

The present teaching relates to the methods, systems and programming for classifying information. Particularly, the present teaching is directed to methods, systems, and programming for classifying information based on content over time, such as assignment of identifiers.

2. Discussion of Technical Background

The advancement of the Internet has made it possible to make a tremendous amount of information accessible to users located anywhere in the world. With the explosion of information, new issues have arisen. First, much effort has been put into organizing the vast amount of information to facilitate the search for information in a more effective and systematic manner. Along that line, different techniques have been developed to automatically or semi-automatically categorize content on the internet into different topics and organize them in an, e.g., hierarchical fashion. Imposing organization and structure on content has led to more meaningful search and has promoted more targeted commercial activities. For example, associating a piece of content with a designated topic identifier often greatly facilitates the presentation of information that is more on the point and relevant. However, variations in content or changes to incoming data, such as misspellings or content not previously associated with a topic, may disrupt the efficacy of the existing systems for categorizing data.

An important issue has to do with how to identify useful information out of massive amounts of available content in order to link different pieces of information in a more meaningful manner. For example, certain processing and enriching systems commissioned with the task of identifying relationships between pieces of information content take in source objects from various feeds, finds duplicates, and merge them to create a composite object. These composite objects are often associated with an identifier. Although system users expect identifiers will persist over time—meaning that over time all new information related to a certain composite object will be properly categorized as such—this is not the case. New information content relevant to existing content is constantly being created and existing solutions fail to incorporate such changes into existing categorization systems. Whereas information may be categorized through content processing and deduplication, there is presently no solution to maintain deduplication decisions over time.

SUMMARY

The present teaching relates to the methods, systems and programming for classifying information. Particularly, the present teaching is directed to methods, systems, and programming for classifying information based on content over time, such as assignment of identifiers.

In an embodiment, a method implemented on at least one computing device having at least one processor, storage, and a communication platform connected to a network for providing identifiers to objects is disclosed. Input data representing a plurality of objects is received and categorized into a plurality of entity categories. A first graph of entities is generated using the plurality of entity categories. The first graph of entities are matched with a second graph of entities. A comparison of object pairs is then made, in which each object pair includes a first object from the first graph of entities and a corresponding second object from the second graph of entities. Identifiers are assigned to each object based on comparing the object pairs.

In another embodiment, a system for providing identifiers to objects is disclosed. The system includes an input categorization unit for categorizing received input data representing a plurality of objects into a plurality of entity categories, a graph generation unit for generating a first graph of entities using the plurality of entity categories, a graph matching unit for matching the first graph of entities with a second graph of entities, a comparison unit for comparing object pairs in which each object pair includes a first object from the first graph of entities and a corresponding second object from the second graph of entities, and an identifier assignment unit for assigning identifiers to each object based on comparing the object pairs.

Other concepts relate to software for providing identifiers to objects. A software product, in accord with this concept, includes at least one machine-readable non-transitory medium and information carried by the medium. The information carried by the medium may be executable program code data regarding parameters in association with a request or operational parameters, such as information related to a user, a request, or a social group, etc.

In another embodiment, a machine readable, non-transitory, tangible medium having information recorded for providing identifiers to objects, in which the information, when read by the machine, causes the machine to categorize received input data representing a plurality of objects into a plurality of entity categories, generate a first graph of entities using the plurality of entity categories, match the first graph of entities with a second graph of entities, compare object pairs in which each object pair includes a first object from the first graph of entities and a corresponding second object from the second graph of entities, and assign identifiers to each object based on comparing the object pairs.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present teaching relates to providing identifiers to source objects. One embodiment of the present teaching further relates to providing persistent identifiers to source objects from various feeds or information content available on a network or other online source. These persistent identifiers demonstrate resiliency to changes in incoming data and in the content match algorithms utilized by the underlying platform. In one embodiment, the present teaching assigns new or existing identifiers to new objects are updated or change and maintains the association between a given identifier and content, even as the content associated with the identifier changes over time.

Figure 1:
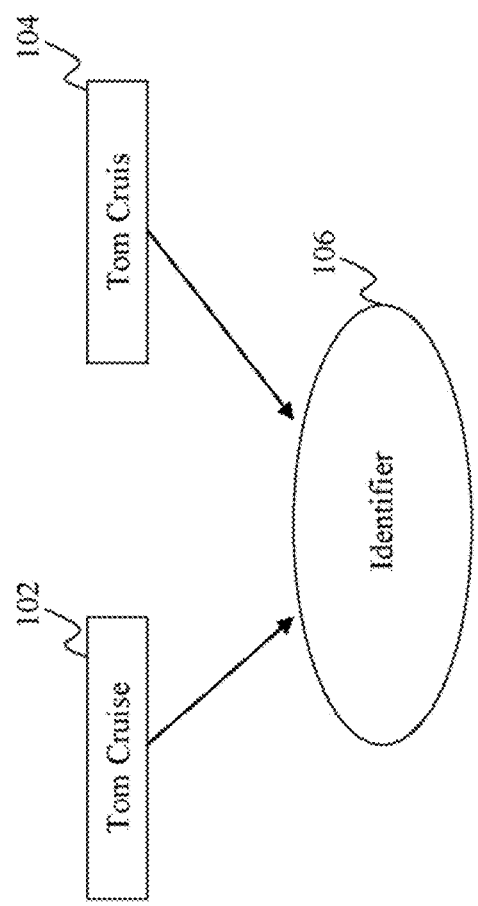
FIG. 1 illustrates an exemplary plurality of objects assigned to a single identifier, according to an embodiment of the present teaching.

According to the present teaching, multiple objects may be associated with a given identifier. FIG. 1 illustrates an example in which two objects 102 and 104, "Tom Cruise" and "Toni Cruis", have been assigned to a single identifier 106 in accordance with the present teaching. In this instance, it has been determined that object 104, "Toni Cruis" is a misspelling of object 102, "Tom Cruise" and thus the object 104, "Tom Cruis" should be assigned the same identifier 106 as 102, "Toni Cruise."

Figure 2:
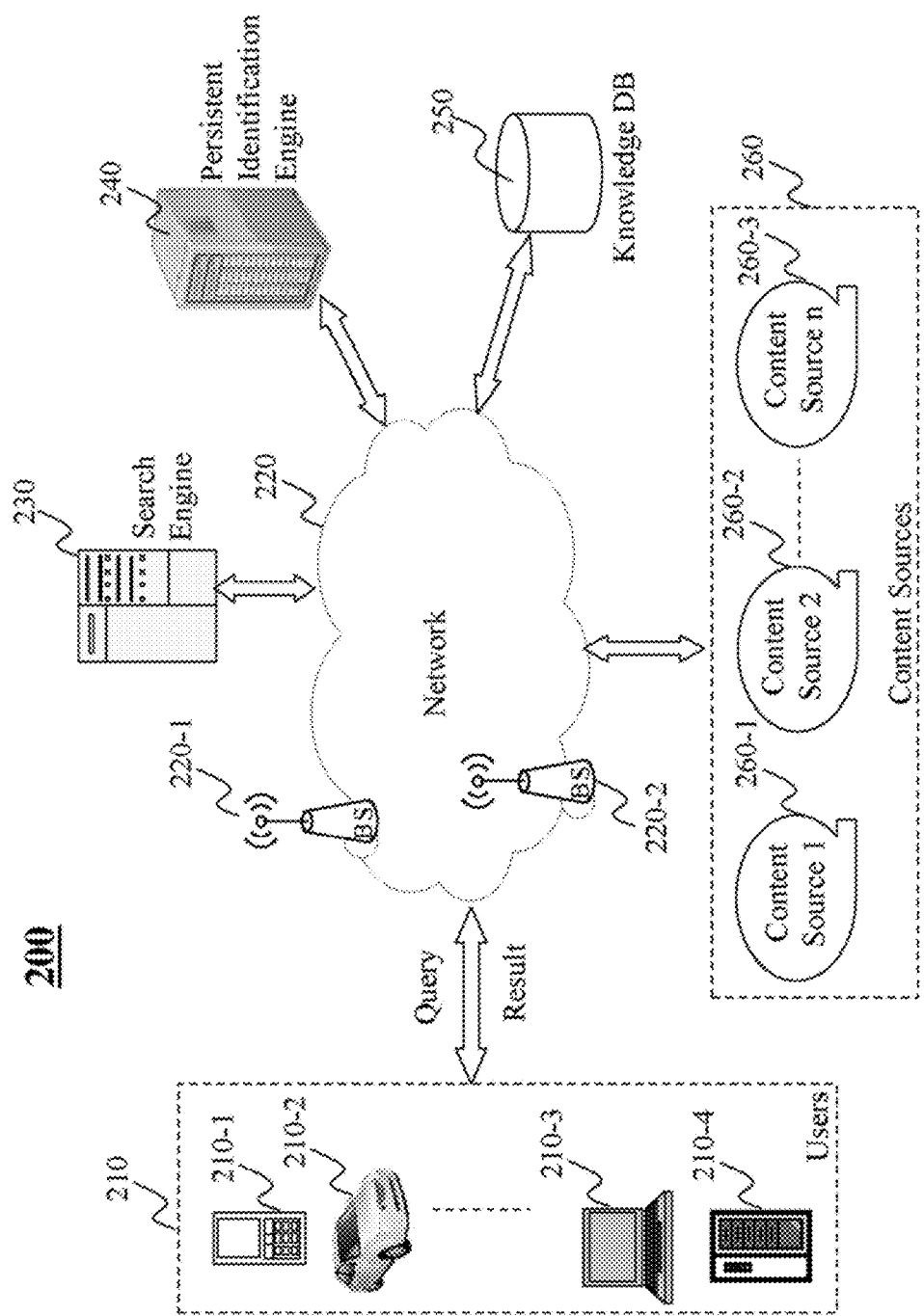
FIG. 2 is a high level depiction of an exemplary system in which persistent identification is applied, according to an embodiment of the present teaching.

FIG. 2 is a high level depiction of an exemplary system 200 in which a persistent identification engine 240 is deployed to provide identifiers, according to a first application embodiment of the present teaching. The exemplary system 200 includes users 210, a network 220, a search engine 230, content sources 260, a persistent identification engine 240, and a knowledge database 250. The network 220 in system 200 can be a single network or a combination of different networks. For example, a network can be a local area network (LAN), a wide area network (WAN), a public network, a private network, a proprietary network, a Public Telephone Switched Network. (PSTN), the Internet, a wireless network, a virtual network, or any combination thereof. A network may also include various network access points, e.g., wired or wireless access points such as base stations or Internet exchange points 220-1, . . . , 220-2, through which a data source may connect to the network in order to transmit information via the network.

Users 210 may be of different types such as users connected to the network via desktop connections (210-4), users connecting to the network via wireless connections such as through a laptop (210-3), a handheld device (210-1), or a built-in device in a motor vehicle (210-2). A user may send a query to the search engine 230 via the network 220 and receive a query result from the search engine 230 through the network 220.

The content sources 260 may include multiple content sources 260-1, 260-2, . . . , 260-3. A content source may correspond to a web page host corresponding to an entity, whether an individual, a business, or an organization such as USPTO.gov, a content provider such as cnn.com and Yahoo-.com, or a content feed source such as tweeter or blogs. Both the search engine 230 and the persistent identification engine 240 may access information from any of the content sources 260-1, 260-2, . . . , 260-3 and rely on such information to respond to a query (e.g., the search engine 230 identifies content related to keywords in the query and returns the result to a user), provide information regarding existing objects, or to classify new or existing entities as objects within the system. The persistent identification engine 240 may also access additional information, via the network 220, stored in the knowledge database 250, which may contain, e.g., structured information such as information about certain objects, identifiers assigned to objects, graphs of entities based on their content, events that link different objects together, etc. The information in the knowledge database 250 may be generated by one or more different applications (not shown), which may be running on the search engine 230, at the backend of the search engine 230, or as a completely stand-alone system capable of connecting to the network 220, accessing information from different sources, analyzing the information, generating structured information, and storing such generated information in the knowledge database 250.

Figure 3:
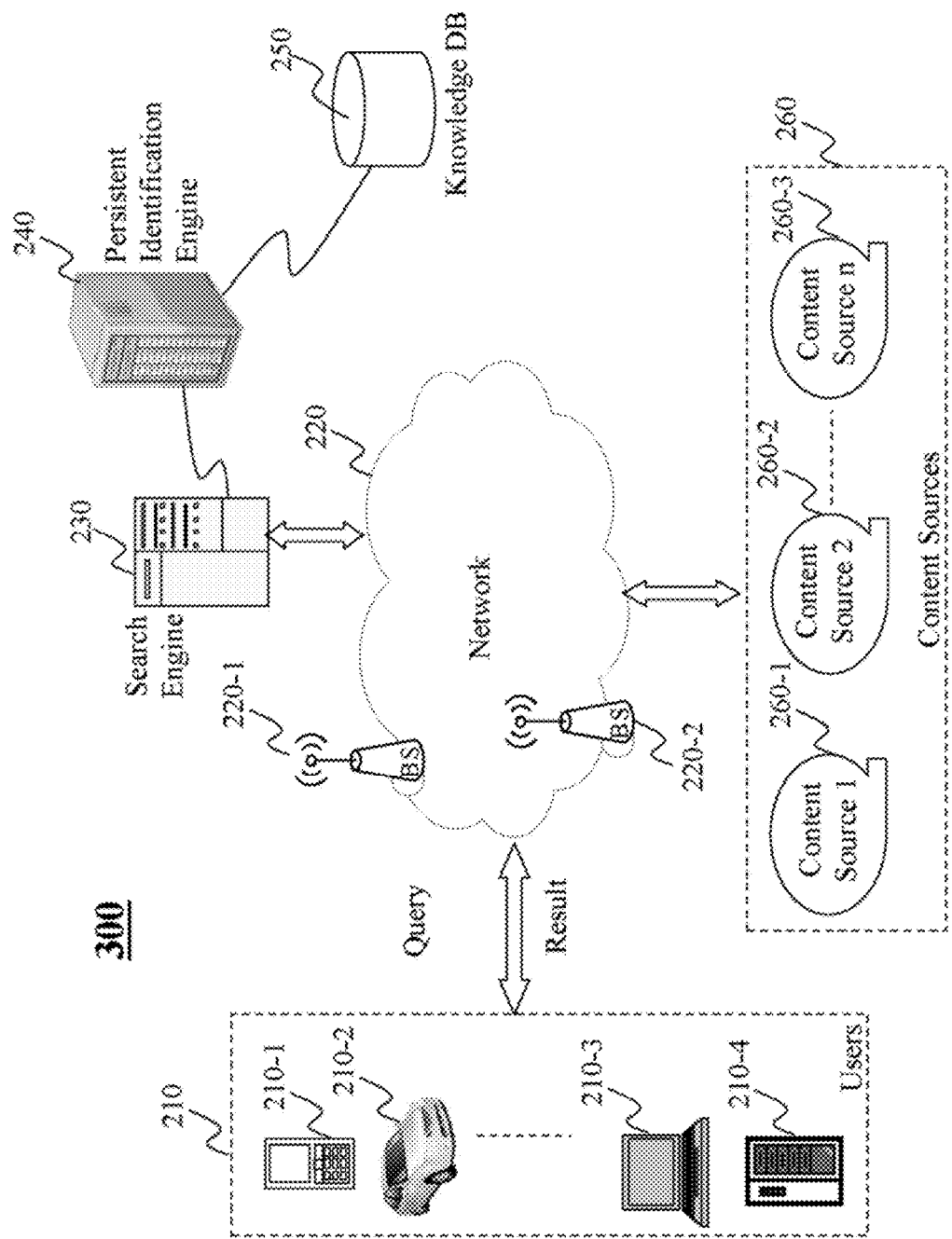
FIG. 3 is a high level depiction of an exemplary system in which persistent identification is applied, according to an embodiment of the present teaching.

FIG. 3 is a high level depiction of an exemplary system 300 in which a persistent identification engine is deployed to provide identifiers, according to a second application embodiment of the present teaching. In this embodiment, the persistent identification engine 240 serves as a backend system of the search engine 230. All inquiries are sent to the search engine 230, which then accesses information generated by the persistent identification engine 240.

Figure 4:
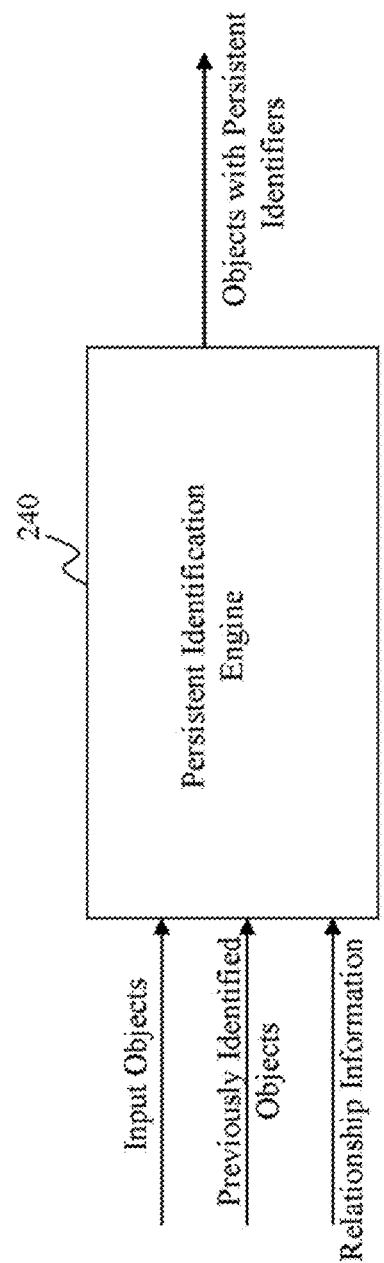
FIG. 4 depicts a high level overview of the inputs and output of an exemplary persistent identification engine, according to an embodiment of the present teaching.

FIG. 4 depicts certain inputs and output of the persistent identification engine 240, according to an embodiment of the present teaching. In the depicted embodiment, the persistent identification engine 240 receives input objects, previously identified objects, and any existing relationship information between the two. In one embodiment, the persistent identification engine receives input objects, such as entities or data, provided by the network 220 from a content source 260. The persistent identification engine 240 may receive additional information such as content accessible from the network and structure information from the knowledge database 250 as inputs. By analyzing the input objects, the previously identified objects, and relationship information, one embodiment of the relationship engine 240 assigns each object with a persistent identifier and outputs this information to the knowledge database 250.

Figure 5:
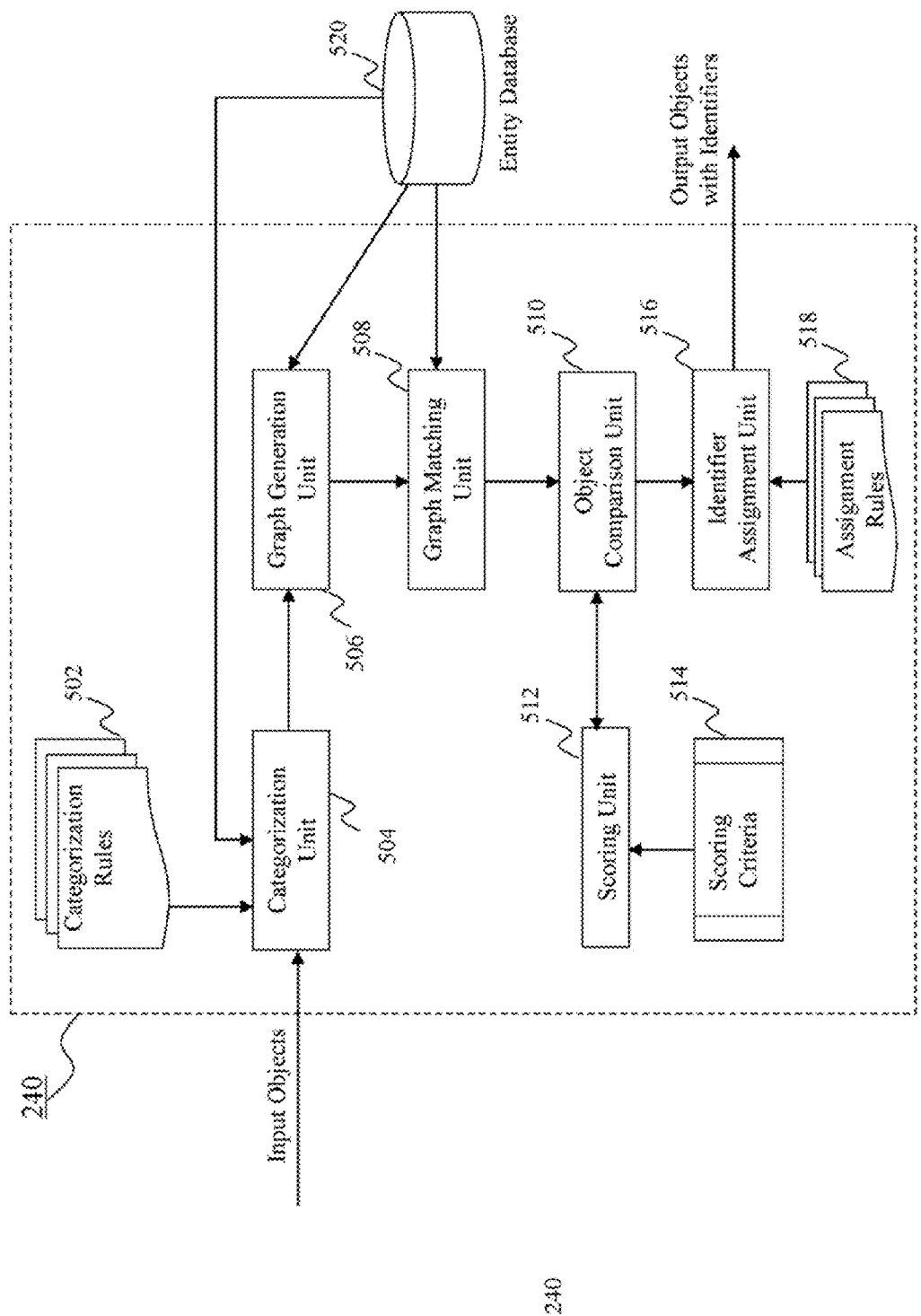
FIG. 5 depicts a high level exemplary system diagram of a persistent identification engine, according to an embodiment of the present teaching.

FIG. 5 depicts a high level exemplary system diagram of a persistent identification engine 240 according to an embodiment of the present teaching. As seen in the depicted embodiment, the persistent identification engine 240 includes categorization rules 502, a categorization unit 504, a graph generation unit 506, a graph matching unit 508, object comparison unit 510, a scoring unit 512, scoring criteria 514, an identifier assignment unit 516, and assignment rules 518. The categorization unit receives and processes the input objects using categorization rules. In one embodiment, the categorization unit uses these rules to partition the input objects into a plurality of entity categories.

Input objects are received at a persistent identification engine 240 by a categorization unit 504. Categorization unit 504 categorizes received input data which represents a plurality of objects and categorizes them into a plurality of entity categories. Categorization is performed based on categorization rules 502 which are provided to categorization unit 504. Categorization unit 504 may further receive information from entity database 520, which includes information about all entities which are already stored and for which identifiers have been assigned. The different categories may comprise a new entity category, previously deleted entity category, split entity category, merged entity category, or shuffled entity category. An object is assigned to a new entity category upon determining that an object is not recognized. An object is assigned to a deleted entity category upon determining that an object is recognized and has been previously deleted from entity database 520. An object is assigned to a split entity category upon determining that the object was once a part of a composite object that was then split into a plurality of objects. An object is assigned to a merged entity object upon determining that the object is one of a plurality of objects that was subsequently merged into a single composite object. An object is assigned to a shuffled entity category upon determining that an object may belong to both the split entity category and the merged entity category.

Graph generation unit 506 generates a first graph of entities using the plurality of entity categories. Graph generation unit 506 also generates a second graph of entities that correspond with entities from entity database 520.

Graph matching unit 508 matches objects from the first graph of entities with objects from the second graph of entities. Each object match yields an object pair, and thus graph matching unit 508 outputs a plurality of object pairs, where each object pair includes one object from the first graph of entities and a corresponding object from the second graph of entities.

Object comparison unit 510 compares all object pairs in order to determine which object pairs match. Object comparison unit 510 enumerates all possible combinations of object pairs. Each object pair is then scored by scoring unit 512, which uses scoring criteria 514 to assign a similarity score to each object pair. The object pairs may then be filtered based on a similarity score threshold.

Identifier assignment unit 516 assigns identifiers to each object based on the comparison of object pairs. More specifically, identifier assignment unit 516 assigns identifiers based on assignment rules 518. An identifier of a second object pair is assigned to the first object in response to determining a match between the first object and the second object. A new identifier is assigned to any objects from the first graph of entities that does not match any objects from the second graph of entities. Objects from the second graph of entities are deleted if they do not match any objects from the first graph of entities. This ensures that identifiers to entities are always up to date.

Identifier assignment unit 516, using assignment rules 518, may also determine that a second object matches multiple first objects, determine a best match for the second object from the multiple first objects, transfer an identifier from the second object to a matching first object, and assign new identifiers to the remaining first objects.

Identifier assignment unit 516, using assignment rules 518, may also determine that a first object matches multiple second objects, determine a best match for the first object from the multiple second objects, transfer an identifier of the matching second object to the first object, and redirect identifiers of the remaining second objects to point to the first object.

Thus, identifier assignment unit 516 is responsible for assigning persistent identifiers to the objects.

Figure 6:
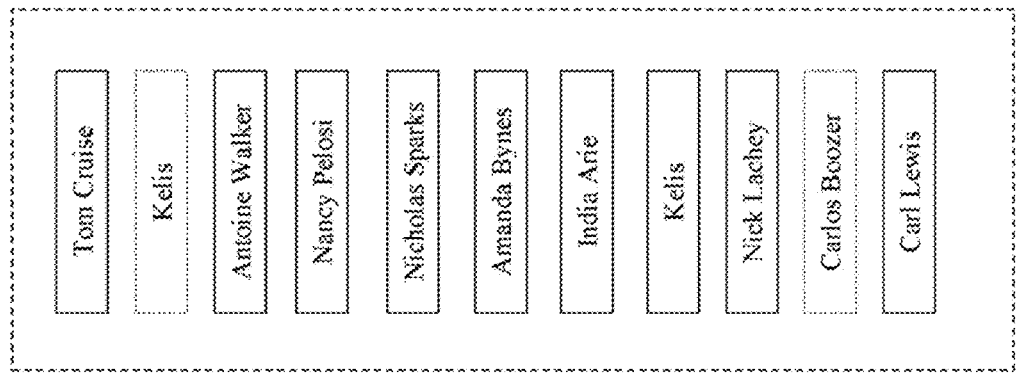
FIG. 6 shows an exemplary representation of the categorization of objects, according to an embodiment of the present teaching.
Figure 6:
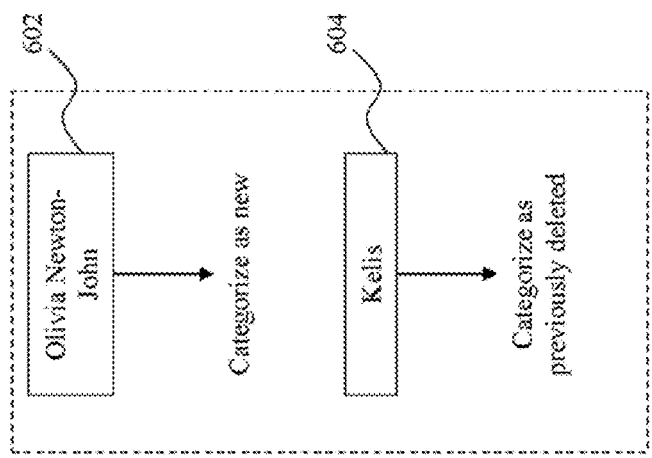
Figure 7:
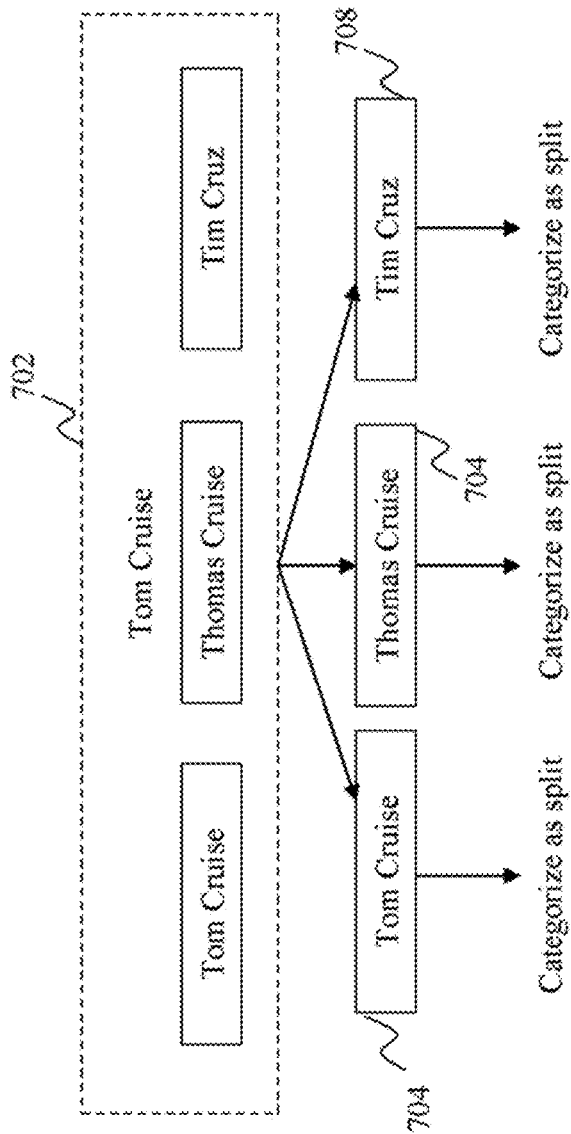
FIG. 7 shows an exemplary representation of a composite object split into a plurality of objects each assigned to a split entity category, according to an embodiment of the present teaching.
Figure 8:
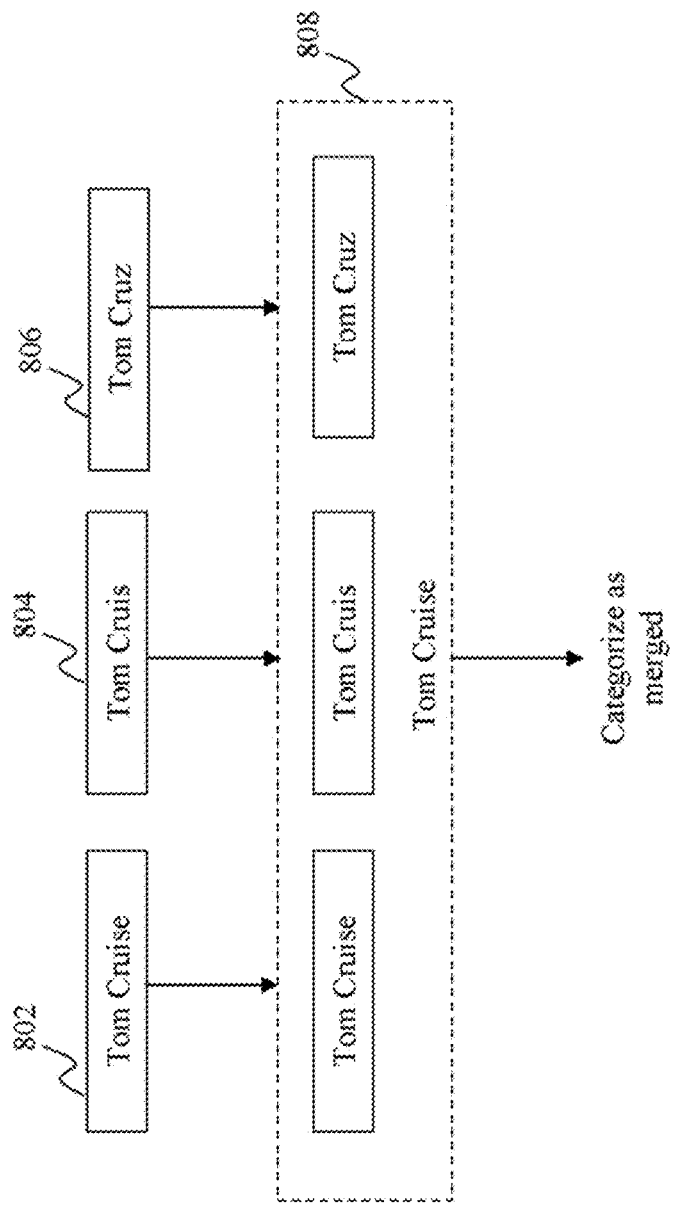
FIG. 8 shows an exemplary representation of a plurality of objects merged into a single composite and assigned to a merged entity category, according to an embodiment of the present teaching.
Figure 9:
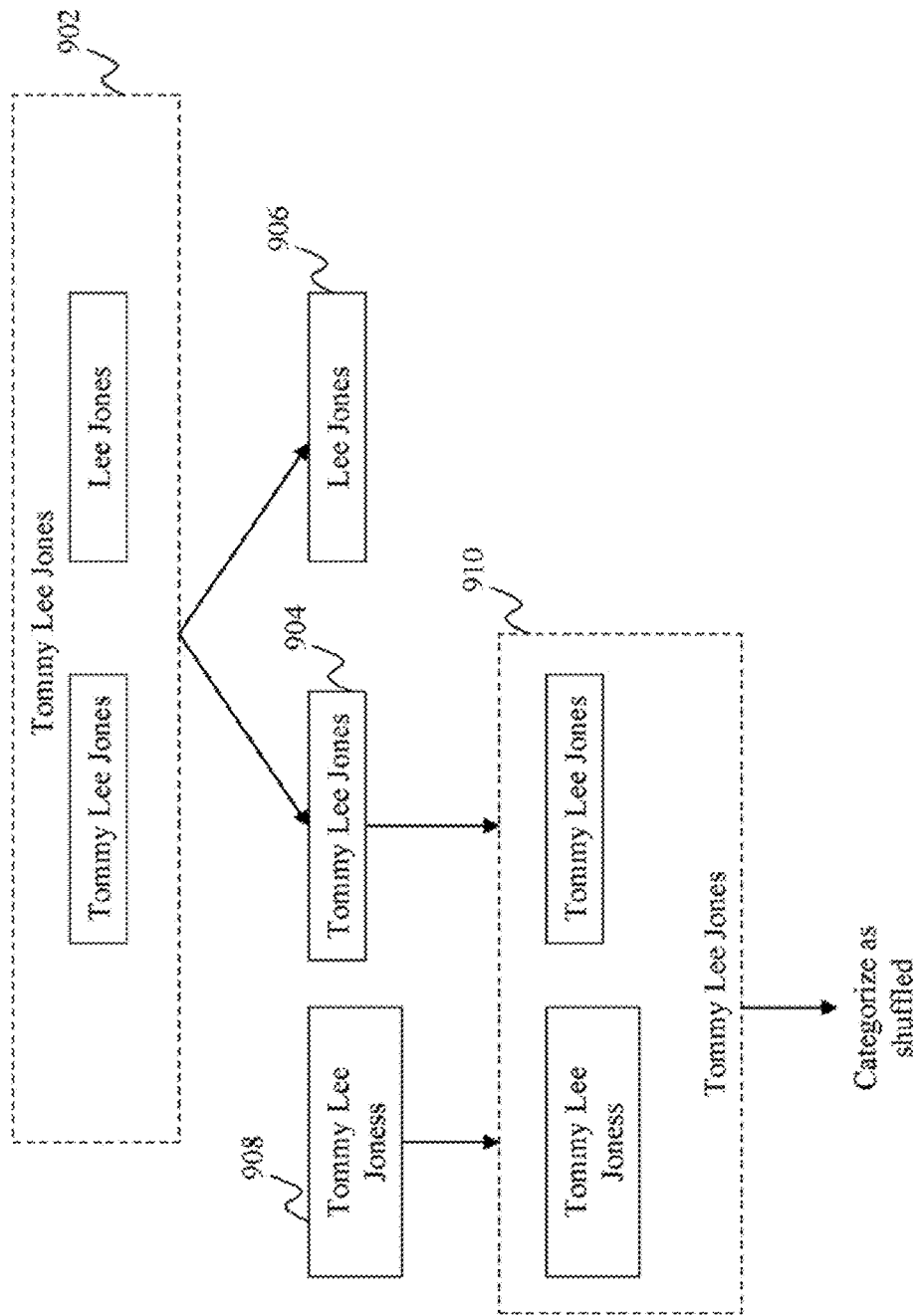
FIG. 9 shows an exemplary representation of an object assigned to a shuffled entity category, according to an embodiment of the present teaching.

One entity category of this embodiment includes new entities that have not previously been seen by the system. FIG. 6 shows an exemplary representation of the categorization of an object. In FIG. 6, the "Olivia Newton-John" input object 602 does not appear among the objects that have been seen to the system, and is accordingly categorized as a new entity. A second category of this embodiment includes deleted entities that have previously been seen but are not part of the current run of the system. In FIG. 6, a "Kelis" object 604 not only appears among the objects that have been seen by the system, but also appears as an object that has previously been deleted from the system. Accordingly the "Kelis" input object 604 in FIG. 6 is categorized as having been previously deleted. A third category of this embodiment includes merged entities that were once separate and have been merged into a single composite object. FIG. 8 shows an exemplary representation of three separate objects, "Tom Cruise" 802, "Tom Cruis" 804, and "Tom Cruz" 806, that are merged into a composite object, "Tom Cruise" 808 and categorized as a merged entity. A fourth category of this embodiment includes split entities that were once part of a composite entity but now exist as separate entities. FIG. 7 shows an exemplary representation of a composite object, "Tom Cruise" 702, that has been split into three distinct objects, "Tom Cruise" 704, "Thomas Cruise" 706, and "Tim Cruz" 708, and categorized as split entities. A fifth category of this embodiment includes shuffled entities that have been merged with certain objects and split from others. FIG. 9 shows an exemplary representation of a shuffled entity. In FIG. 9, the composite object "Tommy Lee Jones" 902 is split into its component objects, "Tommy Lee Jones" 904 and "Lee Jones" 906. The object "Lee Jones" 906 is merged with "Tommy Lee Joness" 908 to create the composite object "Tommy Lee Jones" 910, which is categorized as a shuffled entity.

Figure 16:
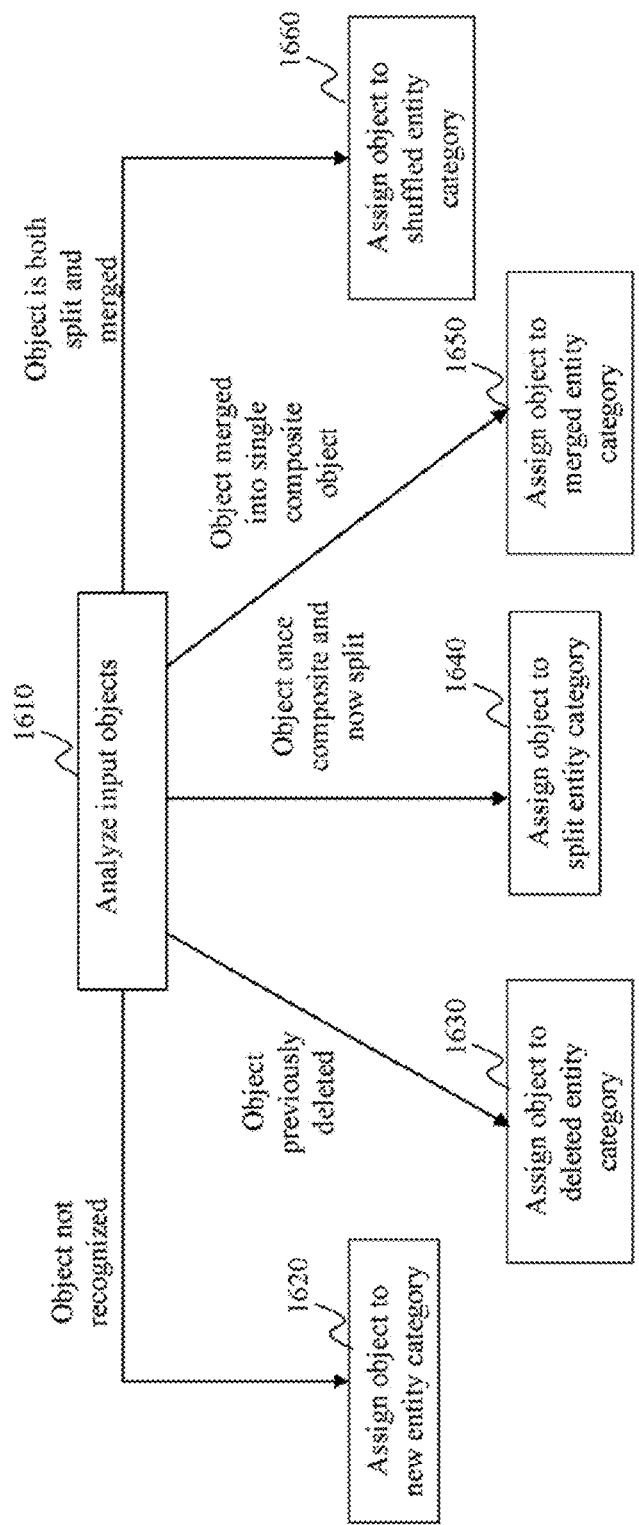
FIG. 16 depicts an exemplary process by which input objects are analyzed and assigned to a category, according to an embodiment of the present teaching.

FIG. 16 depicts an overview of the exemplary process by which input objects are analyzed and assigned to a category, according to an embodiment of the present teaching. According to this embodiment, objects that are not recognized are assigned to a new entity category, objects that were previously deleted from the system are assigned to a deleted entity category, objects that were previously part of a composite object that has been split into a plurality of objects are assigned to a split entity category, separate objects that were merged into a single composite object are assigned to a merged entity category, and objects that have been both split and merged are assigned to a shuffled entity category.

In one embodiment, the categorization unit utilizes an algorithm to partitions the input objects into entity categories based on the characterization rules. The graph generation unit receives the input objects and entity categories and from the categorization unit and generates a first graph of entities using the entity categories. The graph generation unit further generates a second graph of entities using data stored in the entity database. Both the first graph of entities and second graph of entities are received by an object comparison unit, which matches the first graph of entities with the second graph of entities based on the content of the graphs.

At step 1610, persistent identification engine 240 analyzes all input objects. If an object is not recognized, the process proceeds to step 1620 where the object is assigned to a new entity category. If an object was previously deleted, the process proceeds to step 1630 where the object is assigned to a deleted entity category. If an object was once composite and now split, the process proceeds to step 1640 where the object is assigned to a split entity category. If an object was merged into a single composite object, the process proceeds to step 1650 where the object is assigned to a merged entity category. If an object is both split and merged, the process proceeds to step 1660 where the object is assigned to a shuffled entity category.

Figure 17:
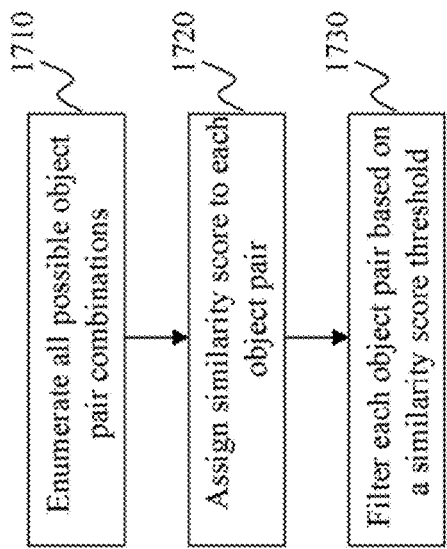
FIG. 17 depicts an exemplary process by which object pairs are filtered based on a similarity score threshold, according to an embodiment of the present teaching.

In one embodiment, the object comparison unit generates object pairs using each source object's identifier as a bridge. These object pairs are assigned a similarity score by a scoring unit based on certain scoring criteria. The object comparison unit may also determine that an object from the first graph of entities does not match with an object from the second graph of entities. The object comparison unit may also determine that an object from the first graph of entities matches with several objects from the second graph of entities, or vice versa. The assigned similarity scores for each pair are used to filter the object pairs based on a similarity score threshold. FIG. 17 depicts an exemplary process according to one embodiment of the present teaching. At 1710, persistent identification engine 240 enumerates all possible object pair combinations. At 1720, a similarity score is assigned to each object pair. At 1730, each object pair is filtered based on a similarity score threshold. The resultant object pairs are provided to an identifier assignment unit which further categorizes the object pairs based on a set of assignment rules.

Figure 18:
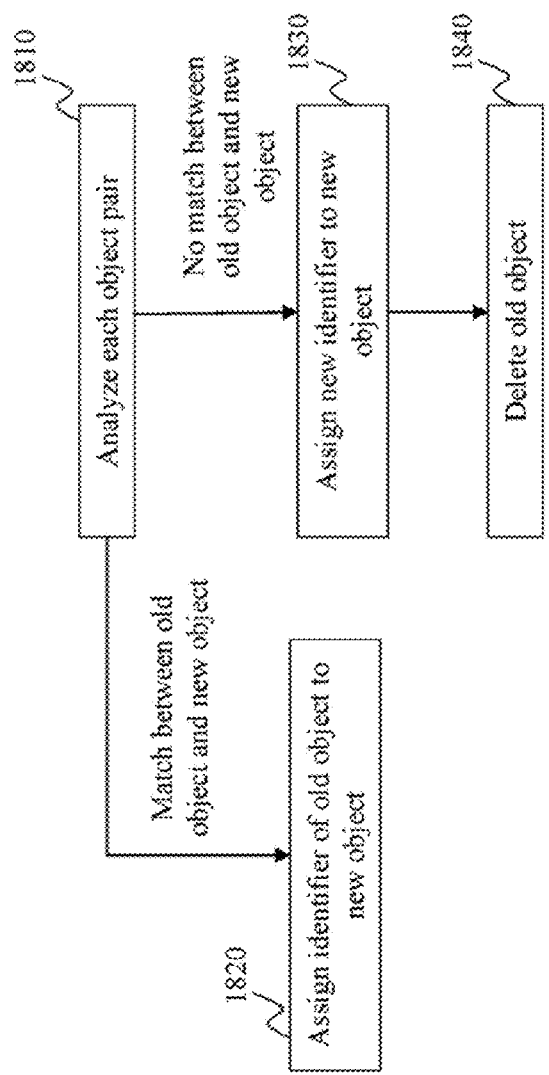
FIG. 18 depicts an exemplary process by which object pairs are analyzed and assigned identifiers, according to an embodiment of the present teaching

FIG. 18 depicts an exemplary process according to the present teaching. At 1810, each object pair is analyzed to determine whether a match between an old object and a new object exists. At 1820, if there is a match between an old object and a new object, the identifier of the old object is assigned to the new object whereas in the absence of any such match, the process proceeds to 1830, where a new identifier is assigned to a new object and at 1840, the old object being deleted. In one embodiment, the identifier assignment unit categorizes the object pairs into one of five types.

Figure 10:
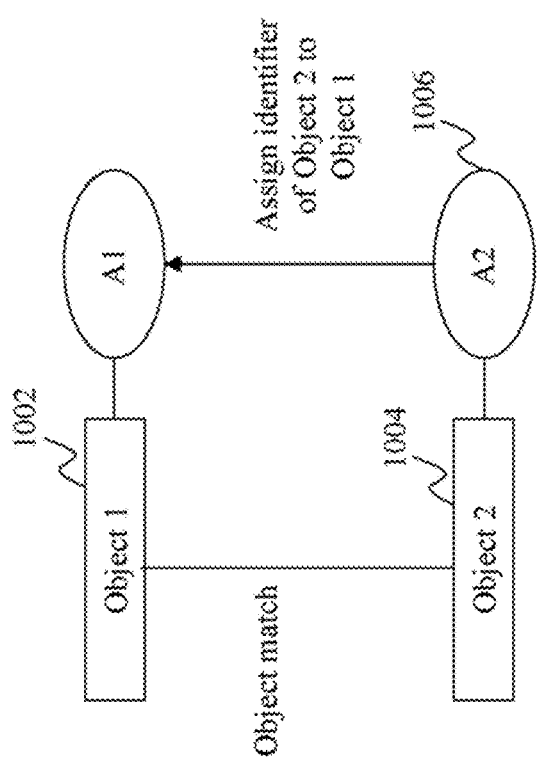
FIG. 10 depicts an exemplary representation of an identifier being assigned to a new object, according to an embodiment of the present teaching.

The first type of object pair according to this embodiment is one in which a match between the objects is found. Given this type of object pair, the identifier assignment unit transfers the identifier of the object from the second graph of entities to the object from the first graph of entities. FIG. 10 depicts an exemplary diagram by which the identifier of one object is assigned to a second object once a match between the objects is established. In FIG. 10, an object match has been found between Object 1 1002 and Object 2 1004. As a result, the identifier 1006 of Object 2 1004 is assigned to Object 1 1002.

Figure 11:
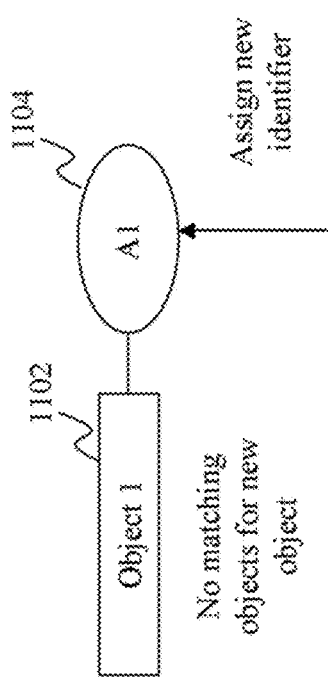
FIG. 11 depicts an exemplary representation of a new identifier being assigned to a new object, according to an embodiment of the present teaching.

The second type of object pair according to this embodiment is one in which the object from the first graph of entities does not match any object from the second graph of entities. Given this type of object pair, a new identifier is generated and assigned to the new object from the first graph of entities. FIG. 11 depicts an exemplary diagram by which a new identifier is assigned to a new object that does not match any existing objects. In FIG. 11, there are no objects that match a new Object 1 1102. As a result, Object 1 1102 is assigned a new identifier 1104, A1.

Figure 12:
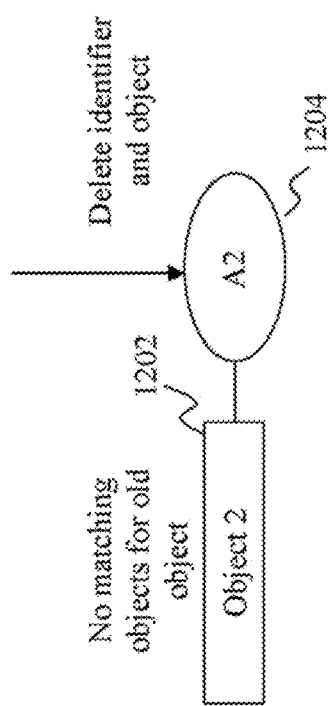
FIG. 12 depicts an exemplary representation of an object and identifier being deleted, according to an embodiment of the present teaching.

The third type of object pair according to this embodiment is one in which the object from the second graph of entities does not match any object from the first graph of entities. Given this type of object pair, the identifier assignment unit marks the object from the second graph of entities as deleted and removes the object from the system. FIG. 12 depicts an exemplary diagram by which the old object does not match any of the new objects and the old object and associated identifier are deleted. In FIG. 12, there are no objects that match an old Object 2 1202. As a result, Object 2 1202 and its identifier, A2 1204, are deleted.

Figure 13:
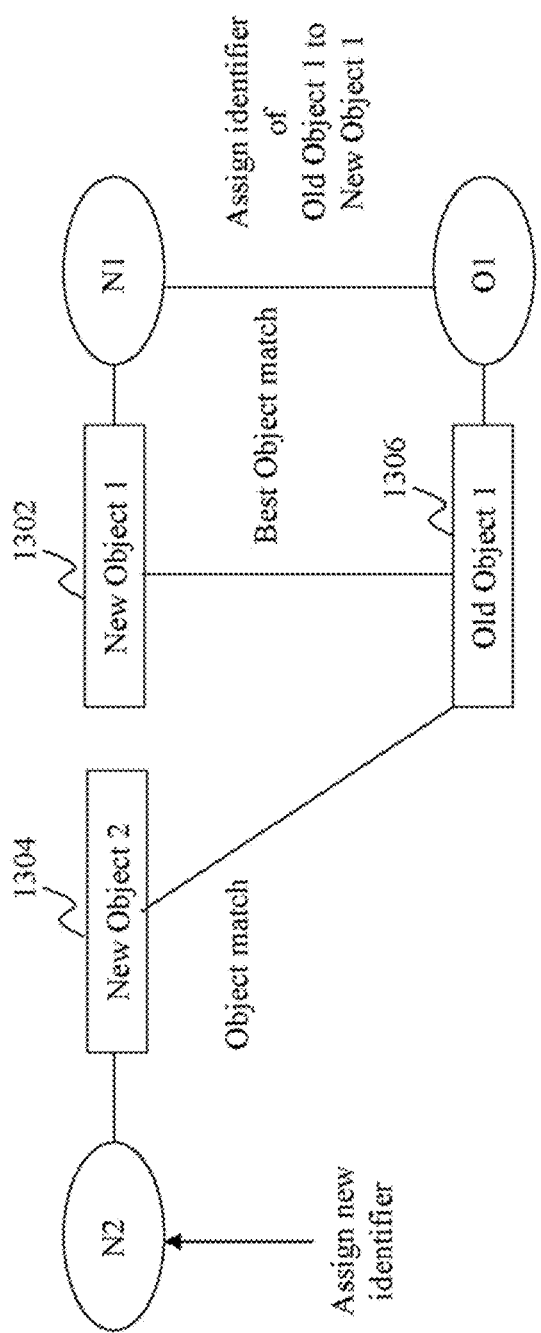
FIG. 13 depicts an exemplary representation of identifiers being assigned based on a comparison of object pairs, according to an embodiment of the present teaching.
Figure 19:
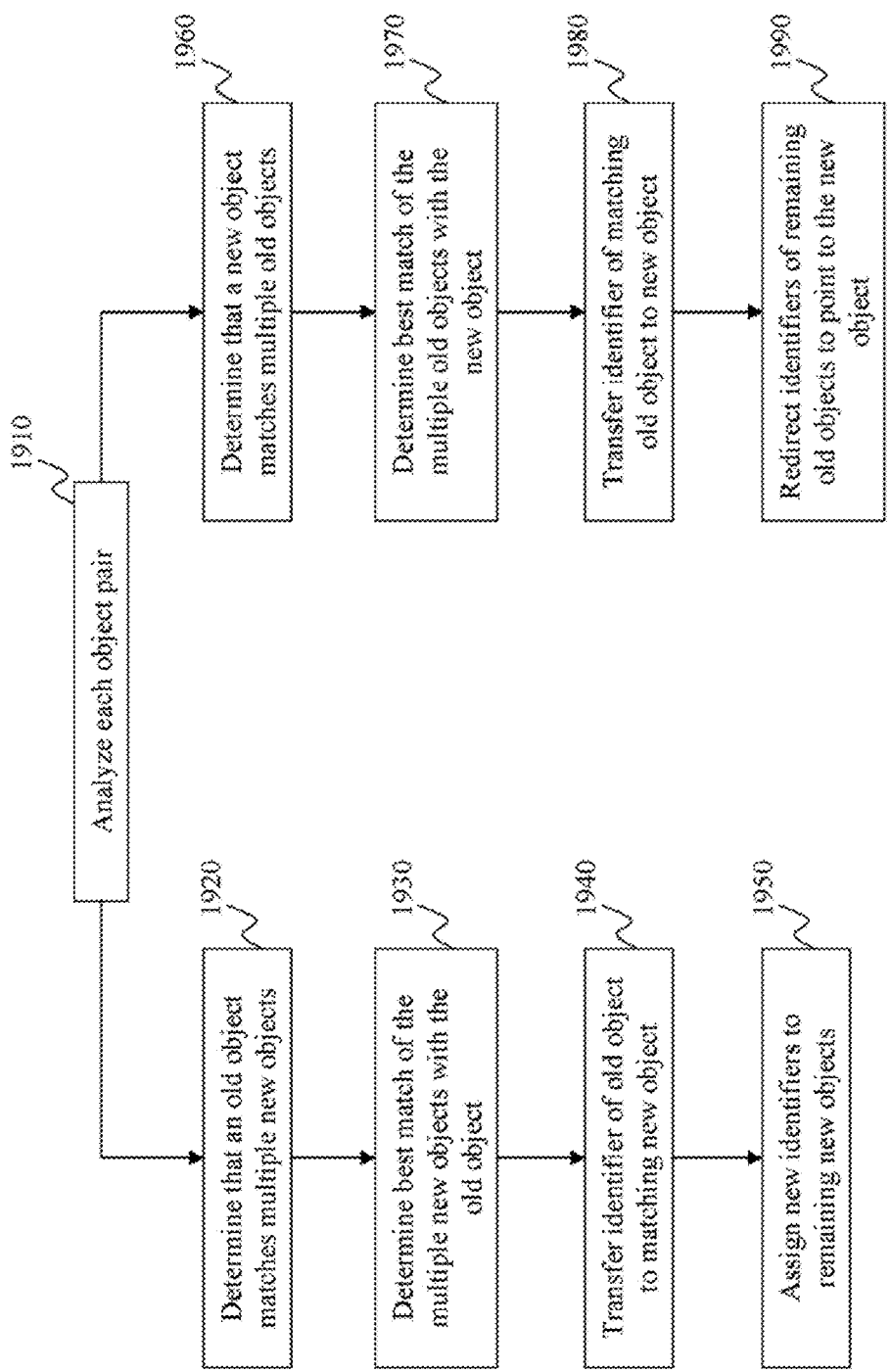
FIG. 19 depicts an exemplary process by which object pairs are analyzed and identifiers are either assigned or redirected.

The fourth type of object pair according to this embodiment is one in which an object from the second graph of entities matches multiple objects from the first graph of entities. Given this type of object pair, the identifier assignment unit identities the best match for the object from the second graph of entities and transfers the identifier from the best matching object from the second graph of entities to the object from the first graph of entities. The identifier assignment unit assigns a new identifier to the remaining objects from the first graph of entities. FIG. 13 depicts an exemplary diagram by which New Object 1 1302 and New Object 2 1304, both of which match Old Object 1 1306, are assigned identifiers. In FIG. 13, the match between New Object 1 1302 and Old Object 1 1306 is determined to be the best object match and the identifier of Old Object 1 1306 is assigned to New Object 1 1302, New Object 2 is assigned a new identifier. FIG. 19 depicts another exemplary process by which an object pair is analyzed according to the present teaching. At 1910, each object pair is analyzed. The process may then proceed at 1920, where an old object is determined to match multiple new objects. At 1930, the best match of the multiple new objects with the older object is determined. At 1940, the identifier of the old object is transferred to the matching new object. At 1950, new identifiers are assigned to the remaining new objects.

Figure 14:
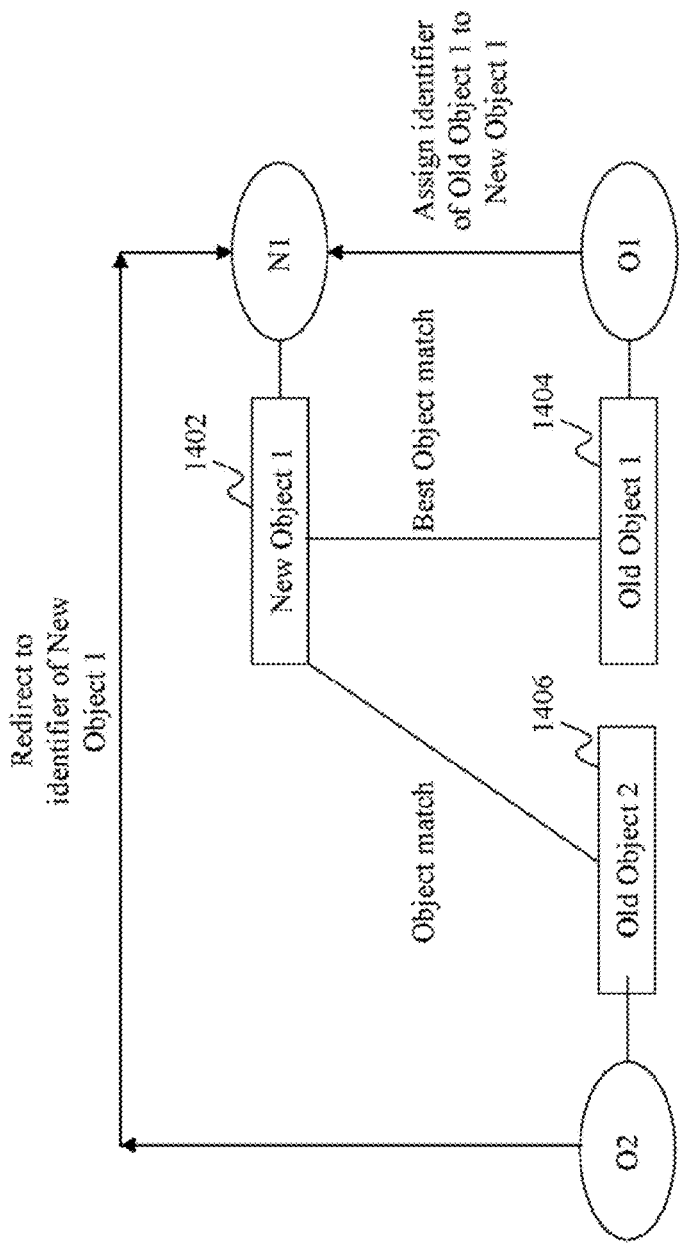
FIG. 14 depicts an exemplary representation of identifiers being assigned and redirected based on a comparison of object pairs, according to an embodiment of the present teaching.

The fifth type of object pair according to this embodiment is one in which the object from the first graph of entities match multiple objects from the second graph of entities. Given this type of object pair, the identifier assignment unit identifies the best outgoing match for the object from the first graph of entities and transfers the identifier from the best matching object from the second graph of entities to the object from the first graph of entities. The remaining objects from the second graph of entities are made to redirect or point to the object from the first graph of entities. FIG. 14 depicts an exemplary diagram by which identifiers are assigned and redirected based on a comparison of one new object with two old objects. In FIG. 14, New Object 1 1402 matches two old objects, Old Object 1 1404 and Old Object 2 1406. The match between Old Object 1 1404 and New Object 1 1402 is determined to be the best object match. The identifier of Old Object 1 1404 is assigned to New Object 1 1402. The identifier of Old Object 2 1406 is redirected to the identifier of New Object 1 1402. FIG. 19 depicts another exemplary process by which an object pair is analyzed according to the present teaching. At 1910, each object pair is analyzed. The process may then proceed to 1960, where a new object is determined to match multiple old objects. At 1970, the best match of the multiple old objects with the new object is determined. At 1980, the identifier of the matching old object is transferred to the new object. At 1990, the identifiers of the remaining old identifiers are redirected to point to the new object.

Figure 15:
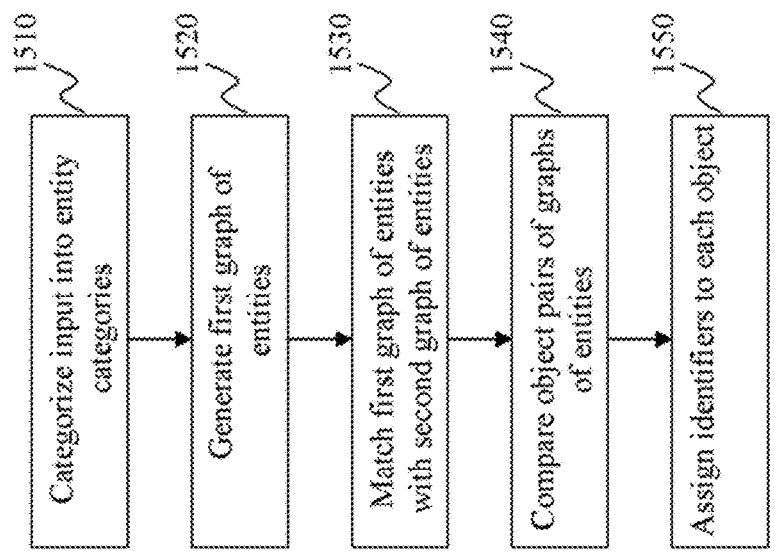
FIG. 15 depicts an exemplary process for assigning identifiers to objects, according to an embodiment of the present teaching.

An exemplary process by which input objects are assigned identifiers is depicted in FIG. 15. At 1510, persistent identification engine 240 receives input objects which are categorized into entity categories. These entity categories are in turn used at 1520 to generate a graph of the entities. At 1530, the graph of these entities is then matched to a second graph of entities already existing in the knowledge database 250. At 1540, all possible pairs of objects from each entity set are compared with one another. Each pair is assigned a similarity score and object pairs are filtered based on a similarity score threshold. At 1550, based on the comparison of object pairs of the graphs of entities, each object is assigned an identifier.

Figure 20:
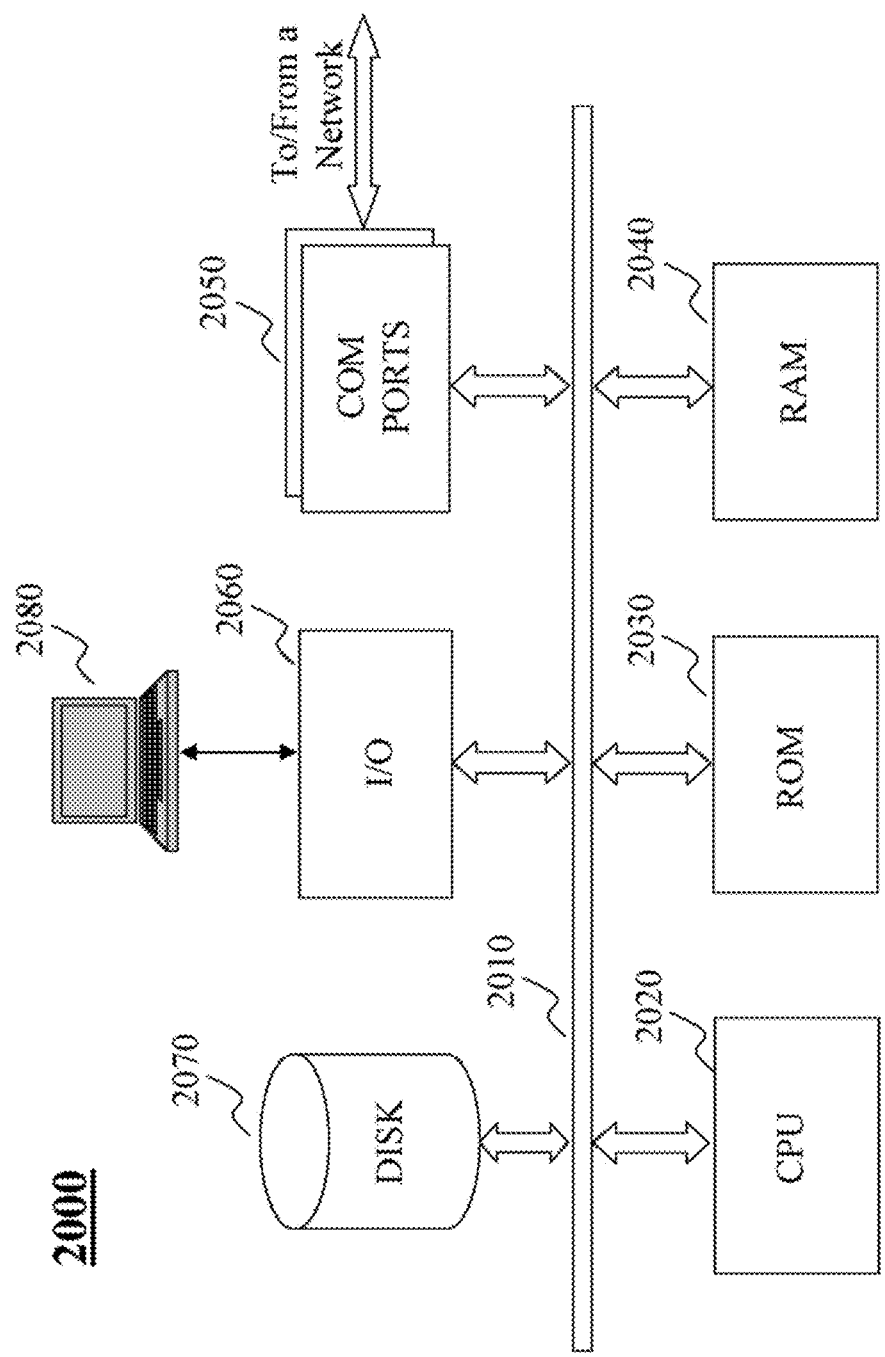
FIG. 20 depicts a general computer architecture on which the present teaching can be implemented.

FIG. 20 depicts a general computer architecture on which the present teaching can be implemented and has a functional block diagram illustration of a computer hardware platform which includes user interface elements. The computer may be a general purpose computer or a special purpose computer. This computer 2000 can be used to implement any components of the present teaching. By way of example and without limitation, the search engine 230, persistent identification engine 240, and/or knowledge DB 250 can all be implemented on a computer such as computer 2000, via its hardware, software program, firmware, or a combination thereof. In addition, the content sources 260 may reside or be hosted on a computer 2000, according to the present teaching. Although only one such computer is shown, for convenience, the computer functions relating to dynamic relation and event detection may be implemented in a distributed fashion on a number of similar platforms, to distribute the processing load.

The computer 2000, for example, includes COM ports 2050 connected to and from a network connected thereto to facilitate data communications. The computer 2000 also includes a central processing unit (CPU) 2020, in the form of one or more processors, for executing program instructions. The exemplary computer platform includes an internal communication bus 2010, program storage and data storage of different forms, e.g., disk 2070, read only memory (ROM) 2030, or random access memory (RAM) 2040, for various data files to be processed and/or communicated by the computer, as well as possibly program instructions to be executed by the CPU. The computer 2000 also includes an I/O component 2060, supporting input/output flows between the computer and other components therein such as user interface elements 2080. The computer 2000 may also receive programming and data via network communications.

Hence, aspects of the methods of receiving user queries and returning a response, e.g., a URL associated with dynamically generated web pages or the content contained in the dynamically generated web pages, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of the search engine operator or other explanation generation service provider into the hardware platform(s) of a computing environment or other system implementing a computing environment or similar functionalities in connection with generating explanations based on user inquiries. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution—e.g., an installation on an existing server. In addition, the dynamic relation/event detector and its components as disclosed herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method implemented on at least one computing device, each computing device having at least one processor, storage, and a communication platform connected to a network for providing identifiers to objects, the method comprising:
   categorizing received input data representing a plurality of objects into a plurality of entity categories;
   generating a first graph of entities using the plurality of entity categories;
   matching the first graph of entities with a second graph of entities;
   comparing object pairs, each object pair including a first object from the first graph of entities and a corresponding second object from the second graph of entities; and
   assigning identifiers to each object based on comparing the object pairs, wherein categorizing received input data into a plurality of entity categories comprises
      determining that a third object is not recognized and assigning the third object to a new entity category,
      determining that a fourth object is recognized and has been previously deleted and assigning the fourth object to a deleted entity category,
      determining that a fifth object was once a part of a composite object that has been split into a plurality of objects and assigning the fifth object to a split entity category,
      determining that a sixth object is one of a plurality of objects merged into a single composite object and assigning the sixth object to a merged entity category, and
      determining that a seventh object may belong to both the split entity category and the merged entity category and assigning the seventh object to a shuffled entity category.

2. The method of claim 1, wherein comparing object pairs comprises:
   enumerating all possible combinations of object pairs between objects from the first graph of entities and objects from the second graph of entities;
   assigning a similarity score to each object pair; and
   filtering each object pair based on a similarity score threshold.

3. The method of claim 1, wherein assigning identifiers to each object based on comparing the object pairs comprises:
   assigning an identifier of the corresponding second object of an object pair to the first object in response to determining a match between the first object and the corresponding second object;
   assigning a new identifier to any objects from the first graph of entities that does not match any objects from the second graph of entities; and
   deleting objects from the second graph of entities that do not match any objects from the first graph of entities.

4. The method of claim 1, wherein assigning identifiers to each object based on comparing the object pairs comprises:
   determining that a second object matches multiple first objects;
   determining a best match for the second object from the multiple first objects;
   transferring an identifier from the second object to a matching first object; and
   assigning new identifiers to remaining first objects among the multiple first objects.

5. The method of claim 1, wherein assigning identifiers to each object based on comparing the object pairs comprises:
   determining that the first object matches multiple second objects;
   determining a best match for the first object from the multiple second objects;
   transferring an identifier of a matching second object to the first object; and
   redirecting identifiers of remaining second objects among the multiple second objects to point to the first object.

6. The method of claim 1, wherein assigning identifiers to each object based on comparing the object pairs comprises:
   assigning a persistent identifier to each object.

7. A machine readable non-transitory and tangible medium having information recorded for providing identifiers to objects, wherein the information, when read by the machine, causes the machine to perform the steps comprising:
   categorizing received input data representing a plurality of objects into a plurality of entity categories;
   generating a first graph of entities using the plurality of entity categories;
   matching the first graph of entities with a second graph of entities;
   comparing object pairs, each object pair including a first object from the first graph of entities and a corresponding second object from the second graph of entities; and
   assigning identifiers to each object based on comparing the object pairs, wherein categorizing received input data into a plurality of entity categories comprises
      determining that a third object is not recognized and assigning the third object to a new entity category,
      determining that a fourth object is recognized and has been previously deleted and assigning the fourth object to a deleted entity category,
      determining that a fifth object was once a part of a composite object that has been split into a plurality of objects and assigning the fifth object to a split entity category,
      determining that a sixth object is one of a plurality of objects merged into a single composite object and assigning the sixth object to a merged entity category and
      determining that a seventh object may belong to both the split entity category and the merged entity category and assigning the seventh object to a shuffled entity category.

8. The machine readable non-transitory and tangible medium of claim 7, wherein comparing Object pairs comprises:
   enumerating all possible combinations of object pairs between objects from the first graph of entities and objects from the second graph of entities;
   assigning a similarity score to each object pair; and
   filtering each object pair based on a similarity score threshold.

9. The machine readable non-transitory and tangible medium of claim 7, wherein assigning identifiers to each object based on comparing the object pairs comprises:
   assigning an identifier of the corresponding second object of an object pair to the first object in response to determining a match between the first object and the corresponding second object;
   assigning a new identifier to any objects from the first graph of entities that does not match any objects from the second graph of entities; and
   deleting objects from the second graph of entities that do not match any objects from the first graph of entities.

10. The machine readable non-transitory and tangible medium of claim 7, wherein assigning identifiers to each object based on comparing the object pairs comprises:
    determining that a second object matches multiple first objects;
    determining a best match for the second object from the multiple first objects;
    transferring an identifier from the second object to a matching first object; and
    assigning new identifiers to remaining first objects among the multiple first objects.

11. The machine readable non-transitory and tangible medium of claim 7, wherein assigning identifiers to each object based on comparing the object pairs comprises:
    determining that the first object matches multiple second objects;
    determining a best match for the first object from the multiple second objects;
    transferring an identifier of a matching second object to the first object; and
    redirecting identifiers of remaining second objects among the multiple second objects to point to the first object.

12. The machine readable non-transitory and tangible medium of claim 7, wherein assigning identifiers to each object based on comparing the object pairs comprises:
    assigning a persistent identifier to each object.

13. A system having at least one processor, storage, and a communication platform connected to a network for providing identifiers to objects, comprising:
    an input categorization unit for categorizing received input data representing a plurality of objects into a plurality of entity categories;
    a graph generation unit for generating a first graph of entities using the plurality of entity categories;
    a graph matching unit for matching the first graph of entities with a second graph of entities;
    a comparison unit for comparing object pairs, each object pair including a first object from the first graph of entities and a corresponding second object from the second graph of entities; and
    an identifier assignment unit for assigning identifiers to each object based on comparing the object pairs, wherein the input categorization unit is further configured for
    determining that a third object is not recognized and assigning the third object to a new entity category,
    determining that a fourth object is recognized and has been previously deleted and assigning the fourth object to a deleted entity category,
    determining that a fifth object was once a part of a composite object that has been split into a plurality of objects and assigning the fifth object to a split entity category,
    determining that a sixth object is one of a plurality of objects merged into a single composite object and assigning the sixth object to a merged entity category, and
    determining that a seventh object may belong to both the split entity category and the merged entity category and assigning the seventh object to a shuffled entity category.

14. The system of claim 13, wherein the comparison unit is further configured for:
    enumerating all possible combinations of object pairs between objects from the first graph of entities and objects from the second graph of entities;
    assigning a similarity score to each object pair; and
    filtering each object pair based on a similarity score threshold.

15. The system of claim 13, wherein the identifier assignment unit is further configured for:
    assigning an identifier of the corresponding second object of an object pair to the first object in response to determining a match between the first object and the corresponding second object;
    assigning a new identifier to any objects from the first graph of entities that does not match any objects from the second graph of entities; and
    deleting objects from the second graph of entities that do not match any objects from the first graph of entities.

16. The system of claim 13, wherein the identifier assignment unit is further configured for:
    determining that a second object matches multiple first objects;
    determining a best match for the second object from the multiple first objects;
    transferring an identifier from the second object to a matching first object; and
    assigning new identifiers to remaining first objects among the multiple first objects.

17. The system of claim 13, wherein the identifier assignment unit is further configured for:
    determining that the first object matches multiple second objects;
    determining a best match for the first object from the multiple second objects;
    transferring an identifier of a matching second object to the first object; and
    redirecting identifiers of remaining second objects among the multiple second objects to point to the first object.

18. The system of claim 13, wherein the identifier assignment unit is further configured for assigning a persistent identifier to each object.

* * * * *